(12) United States Patent
Wang

(10) Patent No.: US 10,732,938 B2
(45) Date of Patent: Aug. 4, 2020

(54) SYSTEM DESIGN APPARATUS AND METHOD

(71) Applicant: KABUSHIKI KAISHA TOSHIBA, Minato-ku (JP)

(72) Inventor: Lan Wang, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 147 days.

(21) Appl. No.: 15/914,231

(22) Filed: Mar. 7, 2018

(65) Prior Publication Data
US 2018/0196646 A1  Jul. 12, 2018

Related U.S. Application Data

(63) Continuation of application No. PCT/JP2015/080818, filed on Oct. 30, 2015.

(51) Int. Cl.
*G06F 8/35* (2018.01)

(52) U.S. Cl.
CPC ..................... *G06F 8/35* (2013.01)

(58) Field of Classification Search
CPC ........... G06F 8/35; G06F 17/2264; G06F 8/20
USPC .................................................. 717/100–135
See application file for complete search history.

(56) References Cited

U.S. PATENT DOCUMENTS

| | | | |
|---|---|---|---|
| 6,775,680 B2 * | 8/2004 | Ehrman | G06F 9/5027 |
| 6,904,598 B2 * | 6/2005 | Abileah | G06F 8/20 |
| | | | 719/313 |
| 7,886,041 B2 | 2/2011 | Outhred et al. | |
| 7,970,601 B2 | 6/2011 | Burmester et al. | |
| 8,112,738 B2 * | 2/2012 | Pohl | G06F 40/14 |
| | | | 717/104 |
| 8,413,109 B2 * | 4/2013 | Pfeifer | G06F 8/10 |
| | | | 717/104 |
| 8,627,272 B1 | 1/2014 | Lin et al. | |
| 8,782,597 B2 | 7/2014 | Wang et al. | |

(Continued)

FOREIGN PATENT DOCUMENTS

| | | |
|---|---|---|
| EP | 1 387 260 A1 | 2/2004 |
| JP | 2004-272909 | 9/2004 |

(Continued)

OTHER PUBLICATIONS

Hegedus, A., et al., "Back-annotation of Simulation Traces with Change-Driven Model Transformations", 2010, IEEE Software Engineering and Formal Methods, pp. 145-155.

(Continued)

*Primary Examiner* — Marina Lee
(74) *Attorney, Agent, or Firm* — Oblon, McClelland, Maier & Neustadt, L.L.P.

(57) ABSTRACT

A system design apparatus has a metamodel definition unit that generates a second metamodel based on a first metamodel described using a modeling language, the second metamodel including the first metamodel, a metamodel of a condition class which describes a condition, and a metamodel which describes an association between the condition class and a trace in order to distinguish presence or absence of the condition with respect to the trace, a model construction unit that constructs a model according to the second metamodel, and a script file generation unit that generates a script file corresponding to the model.

20 Claims, 18 Drawing Sheets

(56) References Cited

U.S. PATENT DOCUMENTS

| | | | | |
|---|---|---|---|---|
| 2004/0237066 | A1* | 11/2004 | Grundy | G06F 8/20 717/104 |
| 2007/0055972 | A1* | 3/2007 | Brown | G06F 8/61 717/174 |
| 2007/0180424 | A1* | 8/2007 | Kazakov | G06F 8/10 717/104 |
| 2009/0083297 | A1* | 3/2009 | Pohl | G06F 17/2247 |
| 2009/0093901 | A1 | 4/2009 | Awile et al. | |
| 2009/0235227 | A1 | 9/2009 | Hartman et al. | |
| 2009/0249284 | A1* | 10/2009 | Antosz | G06F 8/10 717/104 |
| 2010/0023919 | A1* | 1/2010 | Chaar | G06Q 10/06 717/101 |
| 2011/0179397 | A1* | 7/2011 | Pfeifer | G06F 8/10 717/104 |
| 2013/0073138 | A1* | 3/2013 | Callow | G05B 17/02 701/23 |
| 2013/0159974 | A1* | 6/2013 | Norton | G06F 11/3684 717/124 |
| 2015/0100942 | A1 | 4/2015 | Misbhauddin et al. | |
| 2018/0196646 | A1* | 7/2018 | Wang | G06F 8/35 |

FOREIGN PATENT DOCUMENTS

| | | |
|---|---|---|
| JP | 2008-171391 | 7/2008 |
| JP | 2011-048796 | 3/2011 |
| JP | 2012-203860 | 10/2012 |
| JP | 5172585 | 3/2013 |

OTHER PUBLICATIONS

International Search Report dated Jan. 26, 2016 in PCT/JP2015/080818 filed Oct. 30, 2015.

George-Dimitrios Kapos, et al., "Model-based System Engineering using SysML: Deriving Executable Simulation Models with QVT," 8$^{th}$ Annual IEEE Systems Conference (SysCon), 2014, 8 Pages.

Hajime Horiuchi, et al., "Current Trends on Metamodel Standardization: Part 1: Basic Concept and Historical Evolution of Metamodel," IPSJ Magazine, vol. 43, No. 11, Nov. 2002, 20 Pages (with English Translation).

OMG Unified Modeling Language (OMG UML) Superstructure, Object Management Group (OMG), Aug. 2011, Version 2.4.1, 748 Pages.

OMG Systems Modeling Language (OMG SysML), Jun. 2012, Version 1.3, 273 Pages.

* cited by examiner

1. Mapping Requirement To MTL4Sys.class with type="requirement"
2. Mapping Block To MTL4Sys.class with type="block";
3. MTL4Sys.class(_block).has_relation_toMTL4Sys.class(_requirement) =
   ( satisfyWithCondition(ConditionID) | satisfy )
4. Block.Condition = MTL4Sys.class(_Condition)
5. Block.Condition.attribute = MTL4Sys.class.property
6. Block.Condition.constantType = MTL4Sys.class.property(constantType)
7. Block.Condition.Type(pre_cal_condition |pre_env_condition| trigger | aftercondition |after_cal_condition |after_env_condition |functional_type) = class.conditionType.(pre_cal_condition |pre_env_condition| trigger | aftercondition |after_cal_condition |after_env_condition |functional_type)
8. Block.Condition.operation = MTL4Sys.class.function
9. Block.Condition.operation.input = MTL4Sys.class.function.parameter
10. Block.Condition.operation.output = MTL4Sys.class.function.return
11. Block.Condition.operation.formula.preCal = MTL4Sys.class.function.formula.pre(parameter, pre_cal_condition) = pre_result
12. Block.Condition.operation.formula = MTL4Sys.class.function.formula(parameter, pre_result)=result
13. Block.Condition.operation.formula.afterCal = MTL4Sys.class.function.formula.afterCal(MTL4Sys.class.function.formula(parameter, pre_result), after_cal_condition) = after_result
14. UML.classifier.version = MTL4Sys.super.version

FIG.11

```
1.  <MTL4Sys version="1">
2.  <class id="Re2" type="requirement" version="1">
3.  <description version="1">CALCULATE MAXIMUM ACCELERATION OF (TWO-WHEELED) VEHICLE</description>
4.  </class>
5.  <class id="block1" type="block" version="1">
6.  <property idRef="Condition1"/>
7.  <relation targetClass="Re2" type="satisfyWithCondition" version="1"> Condition1</relation>
8.  </class>
9.  <class id="Condition1" type="Condition" version="2">
10. <attribute name="airPressure" lang="en" id="attr0" version="1">
11. <constantType version="2">true</constantType>
12. <ConditionType version="2">pre_env_condition</ConditionType>
13. <value unit="kpa">100±3 </value>
14. </attribute>
15. <attribute name="l" lang="en" id="attr1">
16. <description lang="ja"> DISTANCE FROM START POINT TO EACH TARGET POINT</description>
17. <constantType>false</constantType>
18. <ConditionType>pre_cal_condition</ConditionType>
19. <value unit="m">1000</value>
20. </attribute>
21. <attribute name="t" id="attr2">....</attribute>
22. <attribute name="v" id="attr3">....</attribute>
23. <function id="function1" name="AccEquation">
24. <input>attr1,attr2,attr3</input>
25. <output id="attr4" name="a">
26. <!-- EXAMPLE 1--> <formula id="formula1">$a = \frac{2(l-vt)}{t^2}$ </formula>  <!-- USE MathML -->
27. <!-- EXAMPLE 2--> <formula idRef="Math1"/>  <!-- Math1 IS EXAMPLE THAT IS SEPARATELY DEFINED -->
28. </function>
29. </class>
30. <math id="Math1">$a = \frac{2(l-vt)}{t^2}$ </math>
31. </MTL4Sys>
```

FIG. 12 block_tbl — 1101

| ID (PK) | name | Condition (id,FK) | Operation (id, FK) | attribute | description | super | version |
|---|---|---|---|---|---|---|---|
| Block_001 | block1 | Cons_001 | Para_001 | | | | 1 |

Condition_tbl — 1102

| ID (PK) | name | description | attribute | Formula(id,FK) | version |
|---|---|---|---|---|---|
| Cons_001 | Condition1 | | Attr1,attr2 | Para_001 | 2 | attribute_tbl — 1103

| ID (PK) | name | description | constantType | ConditionType | Condition | version |
|---|---|---|---|---|---|---|
| attr1 | airpressure | | True | Pre_env_condition | 100±3kpa | 1 |
| Attr2 | L | DISTANCE FROM START POINT TO EACH TARGET POINT | False | Pre_cal_condition | l>1000m | 1 | parametric_tbl — 1104

| ID (PK) | name | description | Input (attribute,pre_cal_condition) | Output | formula | version |
|---|---|---|---|---|---|---|
| Para_001 | AccEquation | CALCULATE ACCELERATION | {(l,float,m) (t,float,s) (v,float,m/s)} | {(a,float, m/s²)} | $a = \frac{2(l - vt)}{t^2}$ | 1 |

FIG.18

SYSTEM DESIGN APPARATUS AND METHOD

CROSS REFERENCE TO RELATED APPLICATIONS

This application is a Continuation of International Application No. PCT/JP2015/080818, filed on Oct. 30, 2015, the entire contents of which are incorporated herein by reference.

FIELD

Embodiments of the present invention relate to a system design apparatus and a system design method.

BACKGROUND

Modeling languages, such as a unified modeling language (UML) and a system modeling language (SysML), are used for system design. UML is a general-purpose modeling language, and can be used for software design and automatic generation of a source code. SysML is an extension of UML, and a requirement diagram that defines a function requirement and a parametric diagram that defines a dynamic model are added to UML. By using the SysML, it is possible to design a dynamic model (for example, a model for simulation or optimal calculation).

However, current specifications of metamodels defining grammar and specifications describing UML and SysML models have the following four model description shortfalls. Shortfall 1: There is a problem that it is difficult to define presence or absence of a condition in a distinguishable manner in a trace that defines a relationship between model elements such as an operation model and its satisfying requirement thereof. Shortfall 2: There is a problem that it is difficult to assign version information to each model element. Shortfall 3: There is a problem that it is difficult to define a decomposition relationship between requirements, a so-called disjunction relationship of "OR" in a requirement model definition. Shortfall 4: There is a problem that it is difficult to perform weighting on each relationship between the model element and the requirement in the trace. Incidentally, OMG Systems Modeling Language Version 1.3 is referred to for the trace (Trace) and Shortfalls 1, 3, and 4, and ISO/IEC 19505-2: UML Superstructure Version 2.4 is referred to for Shortfall 2.

BRIEF DESCRIPTION OF THE DRAWINGS

FIG. 11 is a view illustrating an example of a model description language;

FIG. 12 is a view illustrating an example of a script file;

FIG. 18 is a view illustrating an example of a table corresponding to a model element.

DETAILED DESCRIPTION

According to one embodiment, a system design apparatus has a metamodel definition unit that generates a second metamodel based on a first metamodel described using a modeling language, the second metamodel including the first metamodel, a metamodel of a condition class which describes a condition, and a metamodel which describes an association between the condition class and a trace in order to distinguish presence or absence of the condition with respect to the trace, a model construction unit that constructs a model according to the second metamodel, and a script file generation unit that generates a script file corresponding to the model.

Hereinafter, embodiments of the present invention will be described with reference to the drawings.

An embodiment of a system design apparatus will be described with reference to FIGS. 1 to 19. First, the concept of a model in the present embodiment will be described.

Figure 1:
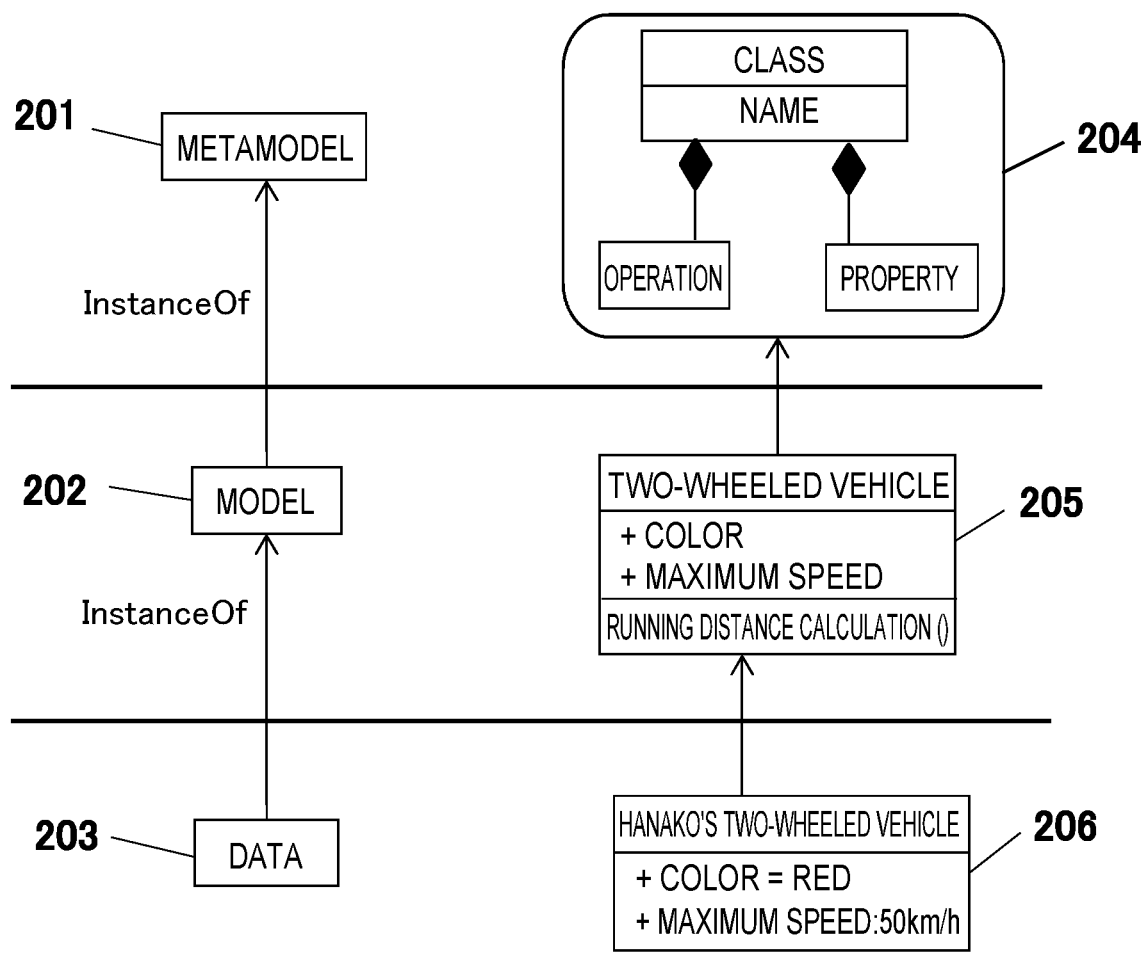
FIG. 1 is a view illustrating a relationship among a metamodel, a model, and data (instance)

FIG. 1 is a view illustrating a relationship among a metamodel, a model, and data (instance).

A metamodel 201 is a higher-order model that defines grammar and a specification for describing a model 202. The metamodel 201 is referred to as a model of the model. A definition example 204 is an example of a definition of a class metamodel. The definition example 204 illustrates that a name is essentially given to a class, and a property and an operation are defined in the class.

The model 202 corresponds to a design diagram of a system such as software, and is configured using various diagrams (model elements) such as a requirement diagram and a block diagram. The model 202 is constructed according to the definition of the metamodel 201. A definition example 205 is an example of a definition of a class (model) defined according to the definition example 204. A definition example 205 illustrates that a name of the class is "two-wheeled vehicle", "color" and "maximum speed" are defined as properties in this class, and "running distance calculation ( )" is defined as an operation.

Data 203 is actual data defined according to the definition of the model 202. A definition example 206 is an example of a definition of actual data of the two-wheeled vehicle class defined according to definition example 205. A definition example 206 illustrates that a name of the data is "Hanako's two-wheeled vehicle", "color" is red, and "maximum speed" is 50 km/h.

Figure 2:
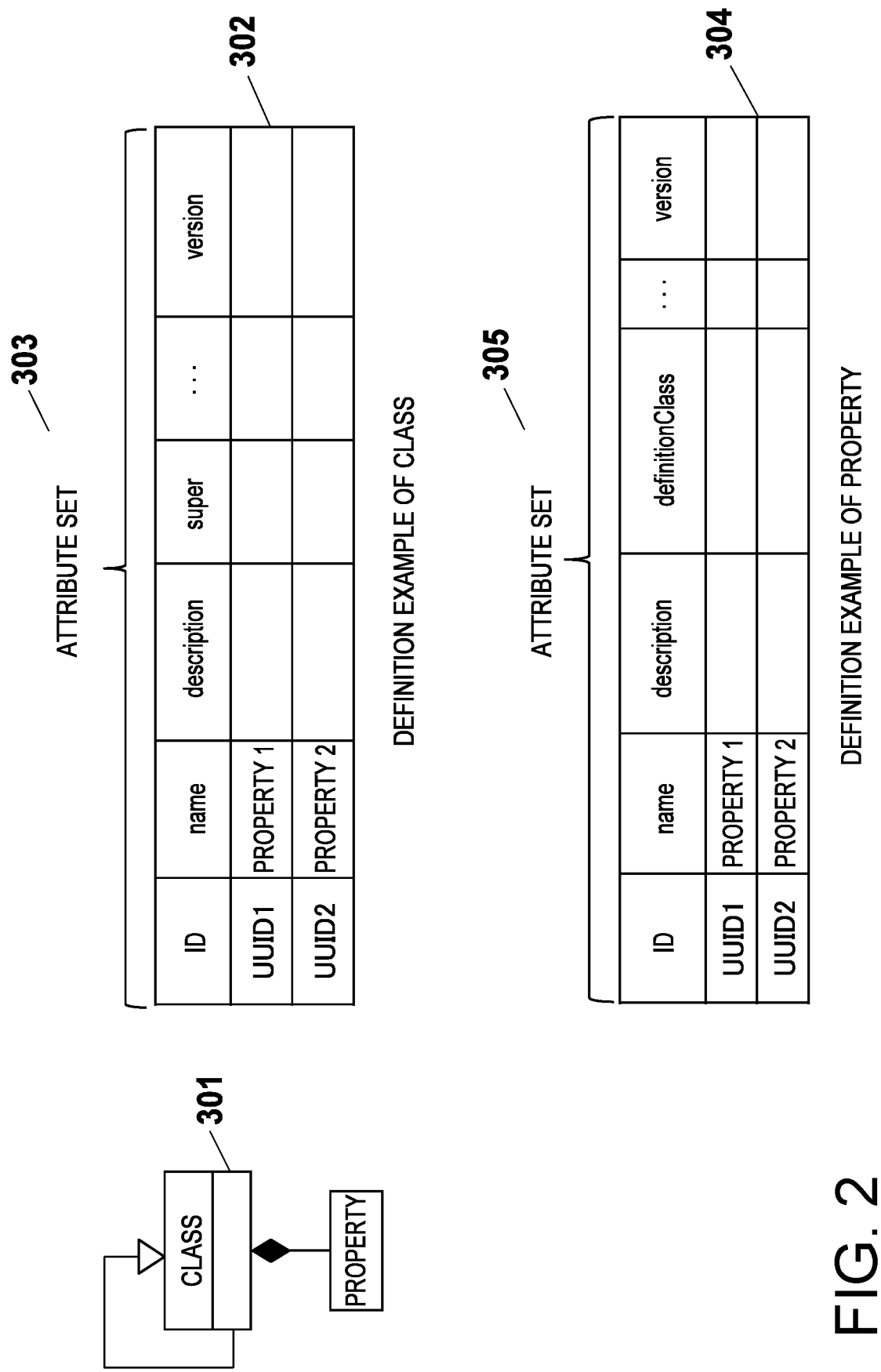
FIG. 2 is a view illustrating a relationship among a class, a property, and an attribute.

FIG. 2 is a view illustrating a relationship among the class, the property, and the attribute.

As described above, the property is defined in the class. The class and property have definition items such as a name and a data type. Hereinafter, individual definition items of the class and property will be referred to as attributes, and a set of the attributes is referred to as an attribute set. The class and property are defined using each attribute set.

In the example of FIG. 2, a class 301 is defined using an attribute set 303 which includes attributes such as an ID, a name, and a description. Specifically, an entity 302 of the class 301 is defined with the attribute set 303.

In addition, a property of the class 301 is defined using an attribute set 305 which includes attributes such as an ID, a name, and a description. Specifically, an entity 304 of the property of the class 301 is defined with the attribute set 305.

Incidentally, a version included in the attribute sets 303 and 304 in FIG. 2 is an attribute that can be newly defined by the system design apparatus according to the present embodiment. The version will be described in detail later.

Figure 3:
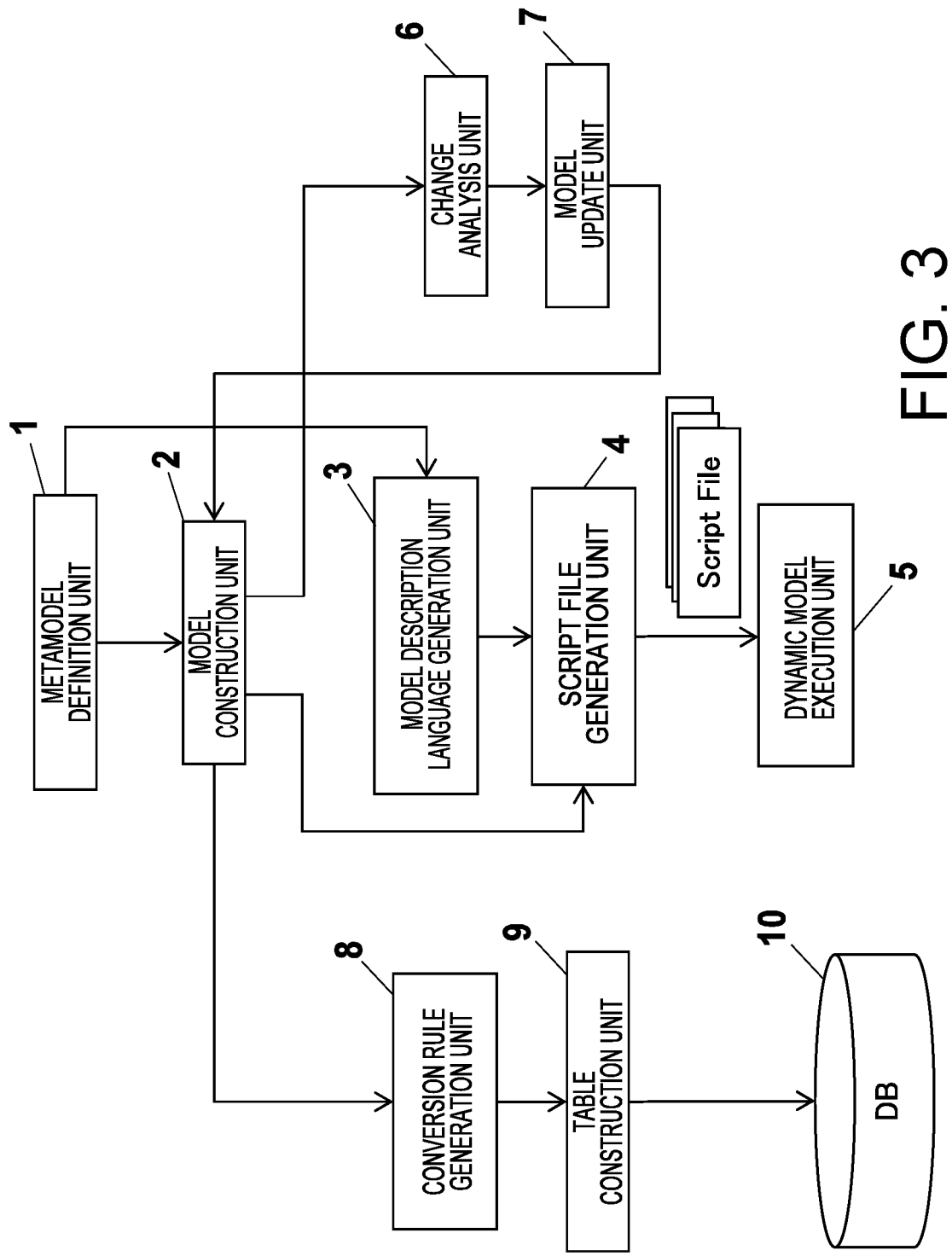
FIG. 3 is a diagram illustrating a functional configuration of a system design apparatus.

Next, the system design apparatus according to the present embodiment will be described with reference to FIG. 3. FIG. 3 is a diagram illustrating a functional configuration of the system design apparatus. As illustrated in FIG. 3, the system design apparatus includes a metamodel definition unit 1, a model construction unit 2, a model description language generation unit 3, a script file generation unit 4, a dynamic model execution unit 5, a change analysis unit 6, a model update unit 7, a conversion rule generation unit 8, a table construction unit 9, and a database (DB) 10.

The metamodel definition unit 1 generates an extended metamodel (second metamodel) based on an existing metamodel (first metamodel) that has been input. The existing metamodel is an existing metamodel that defines a description specification of a model described in UML or SysML. The extended metamodel is a metamodel in which the existing metamodel is defined in an extended manner. The metamodel definition unit 1 generates the extended metamodel by extending and defining a class and a property in the existing metamodel.

The model construction unit 2 constructs (defines) a model according to the extended metamodel generated by the metamodel definition unit 1. Hereinafter, the model constructed by the model construction unit 2 is referred to as an extended model. The model construction unit 2 can edit the extended model.

The model description language generation unit 3 generates a model description language based on the extended metamodel generated by the metamodel definition unit 1. The model description language defines a description format to describe the extended model, defined according to the extended metamodel, as an executable script language.

The script file generation unit 4 generates an executable script file corresponding to the extended model based on the extended model constructed by the model construction unit 2 and the model description language generated by the model description language generation unit 3.

The dynamic model execution unit 5 executes the script file generated by the script file generation unit 4. The execution of the script file corresponds to execution of the extended model.

The change analysis unit 6 analyzes a change content of the extended model that has been edited by the model construction unit 2.

The model update unit 7 updates the extended model based on an analysis result of the change content obtained by the change analysis unit 6.

The conversion rule generation unit 8 generates a conversion rule to store the extended model constructed by the model construction unit 2 in a relational DB.

The table construction unit 9 constructs a table corresponding to the extended model according to the conversion rule generated by the conversion rule generation unit 8.

The DB 10 is a relational database that stores the table constructed by the table construction unit 9.

Incidentally, details of each functional configuration of the system design apparatus will be described later.

Next, a hardware configuration of the system design apparatus according to the present embodiment will be described with reference to FIG. 4. The system design apparatus according to the present embodiment is configured using a computer 100. The computer 100 includes a server, a client, a microcomputer, a general-purpose computer, and the like.

Figure 4:
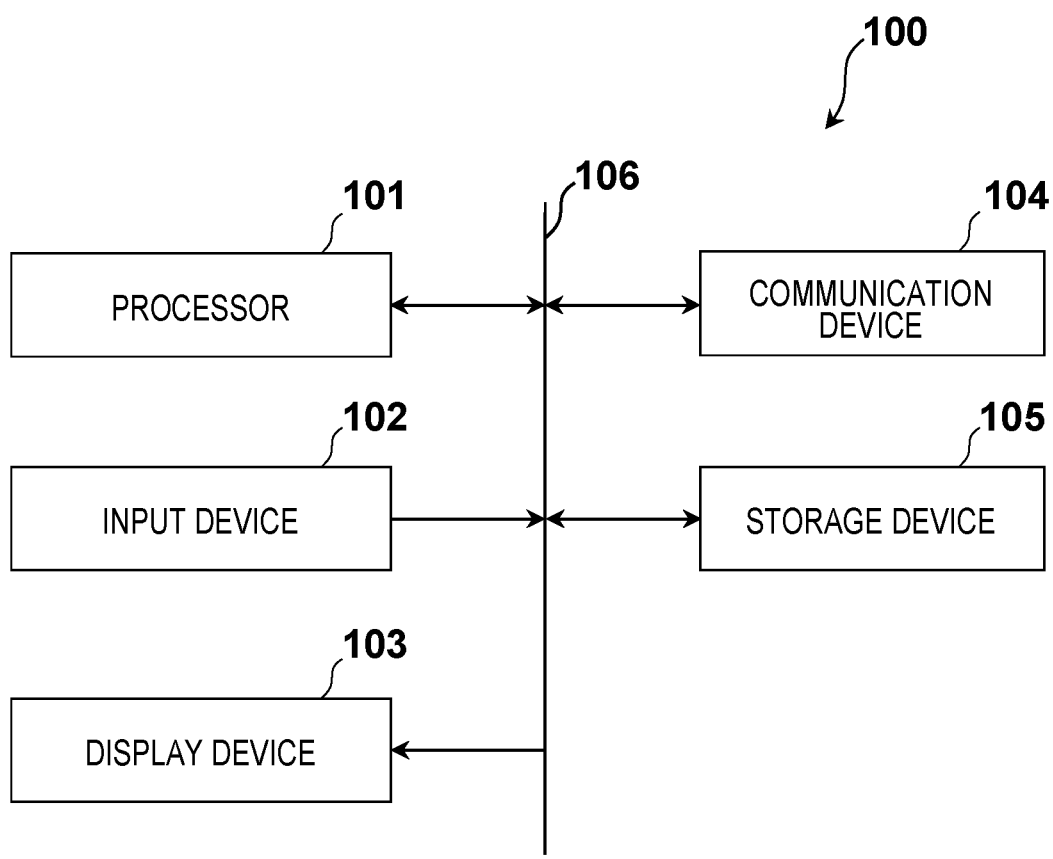
FIG. 4 is a diagram illustrating an example of a computer constituting the system design apparatus.

FIG. 4 is a diagram illustrating an example of the computer 100. The computer 100 in FIG. 4 includes a central processing unit (CPU) 101, an input device 102, a display device 103, a communication device 104, and a storage device 105. The processor 101, the input device 102, the display device 103, the communication device 104, and the storage device 105 are mutually connected by a bus 106.

The processor 101 is an electronic circuit which includes a controller and an operator of the computer 100. The processor 101 performs operational processing based on data and a program input from the respective devices (for example, the input device 102, the communication device 104, the storage device 105) connected thereto via the bus 106, and outputs an operational result and a control signal to the respective devices (for example, the display device 103, the communication device 104, and the storage device 105) connected thereto via the bus 106. Specifically, the processor 101 executes an operating system (OS) of the computer 100, a system design program, and the like, and controls the respective devices constituting the computer 100.

The system design program is a program that causes the computer 100 to implement the above-described respective functional configurations of the system design apparatus. The system design program is stored in a non-transitory tangible computer-readable storage medium. Examples of the above-described storage medium include an optical disk, a magneto-optical disk, a magnetic disk, a magnetic tape, a flash memory, and a semiconductor memory, but the embodiment is not limited thereto. As the processor 101 executes the system design program, the computer 100 functions as the system design apparatus.

The input device 102 is a device configured to input information to the computer 100. Examples of the input device 102 include a keyboard, a mouse, and a touch panel, but the embodiment is not limited thereto. A user can input information, such as an existing metamodel, by using the input device 102.

The display device 103 is a device configured to display an image and a video. Examples of the display device 103 include a liquid crystal display (LCD), a cathode ray tube (CRT), and a plasma display (PDP), but the embodiment is not limited thereto. The display device 103 displays data input to the system design apparatus (the existing metamodel and the like), data generated by the system design apparatus (the extended metamodel, the extended model, the model description language, the script file, and the like), a graphical user interface (GUI) for the user to operate the system design apparatus, and the like.

The communication device 104 is a device configured to allow the computer 100 to communicate with an external device in a wireless or wired manner. Examples of the communication device 104 include a modem, a hub, and a router, but the embodiment is not limited thereto.

The storage device 105 is a storage medium that stores the OS of the computer 100, the system design program, data necessary for execution of the system design program, data generated by executing the system design program, and the like. The storage device 105 includes a main storage device and an external storage device. Examples of the main storage device include a RAM, a DRAM, and an SRAM, but the embodiment is not limited thereto. In addition, examples of the external storage device include a hard disk, an optical disk, a flash memory, and a magnetic tape, but the embodiment is not limited thereto. The DB 10 may be constructed on the storage device 105 or may be constructed on an external server.

Incidentally, the computer 100 may include one or a plurality of the processors 101, the input devices 102, the display devices 103, the communication devices 104, and the storage devices 105, and may be connected to a peripheral device such as a printer and a scanner.

In addition, the system design apparatus may be configured using the single computer 100, or may be configured as a system including a plurality of the computers 100 connected to each other.

Further, the system design program may be stored in advance in the storage device 105 of the computer 100, may be stored in a storage medium outside the computer 100, or may be uploaded on the Internet. In either case, the functions of the system design apparatus are implemented by installing the system design program in the computer 100 and executing the installed program.

Hereinafter, the respective functional configurations of the system design apparatus will be described in detail with reference to FIGS. 5 to 19.

(Metamodel Definition Unit 1 and Model Construction Unit 2)

A method of extending the existing metamodel performed by the metamodel definition unit 1 (a method of generating the extended metamodel) will be described. Hereinafter, each of four extension methods will be described below.

(First Extension Method)

In general, a metamodel is provided with a trace metamodel that defines a relationship between a requirement diagram and another diagram (a block diagram or a parametric diagram).

Figure 5:
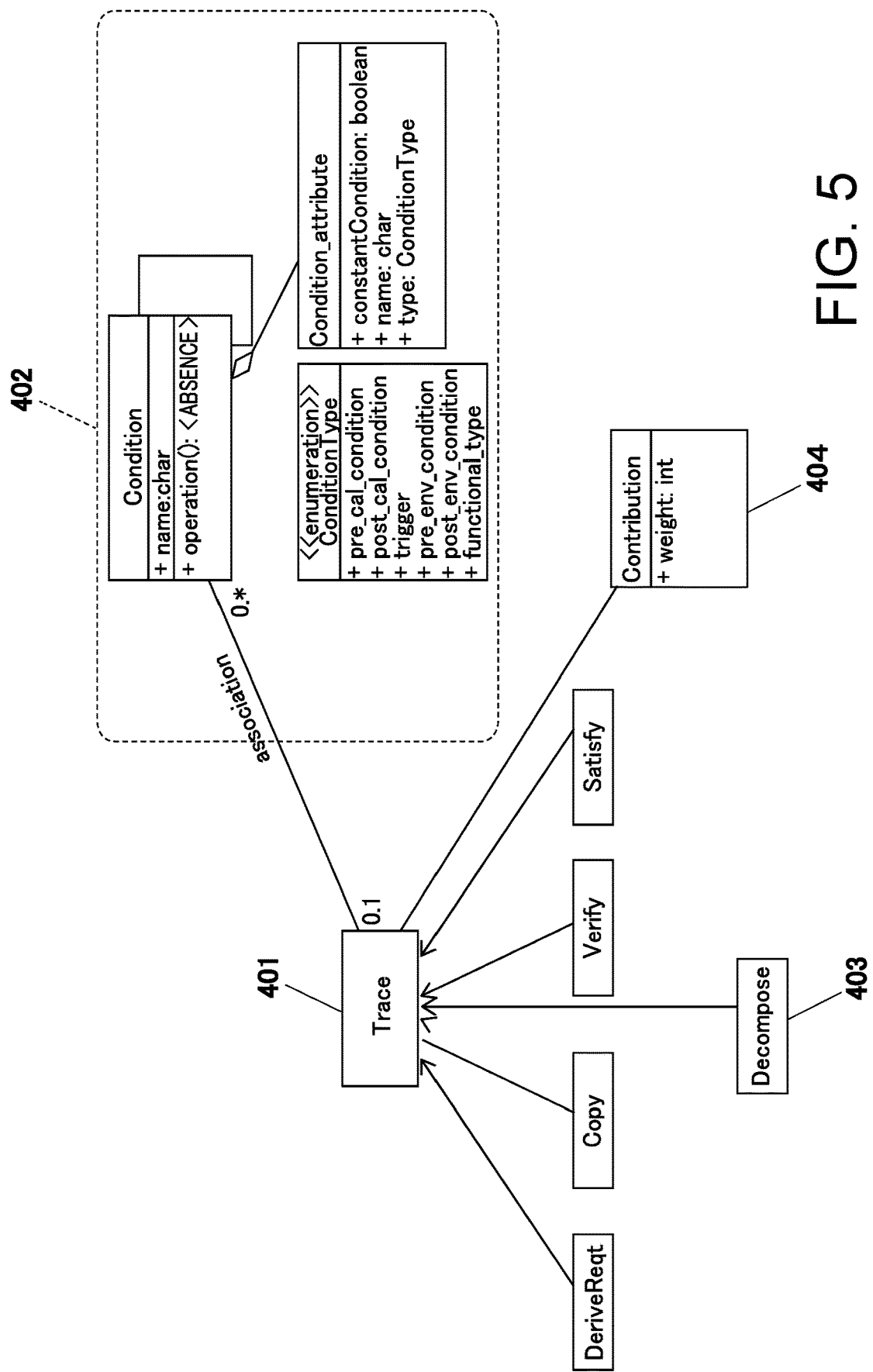
FIG. 5 is a view illustrating an example of a trace metamodel.

FIG. 5 is a view illustrating an example of the trace metamodel. In the example of FIG. 5, "DerivedReqt", "Copy", "Verify", and "Satisfy" are provided as a trace 401 and lower-order classes thereof as existing metamodels. "Satisfy" (hereinafter referred to as a "satisfying relationship") represents a relationship between a requirement and a model element that satisfies the requirement.

Conventionally, it is difficult to distinguish whether there is a condition with respect to the requirement satisfied by the model element in the satisfying relationship. In regard to this, in the first extension method, the metamodel definition unit 1 defines (adds) a condition class (Condition) metamodel as illustrated by 402 in FIG. 5, and extends and defines a metamodel of an association between a condition class and a trace in order to distinguish the presence or absence of a condition with respect to the trace. The condition class (Condition) is a class configured to describe a condition with respect to a requirement.

In the example of FIG. 5, an attribute set (Condition_attribute) of the condition class 402 includes a variability of the condition (constantCondition), a name (Name), and a type of the condition (Type).

The variability of the condition is a Boolean type, and, for example, is defined as "True" in a case where invariant on a time axis (that is, the condition does not change over time) or as "False" in the other case.

The type of the condition is ConditionType (optional type) and includes pre_cal_condition, pre_env_condition, trigger, post_cal_condition, post_env_condition, and functional_type as options.

In this manner, the metamodel definition unit 1 extends and defines the metamodel of the condition class, thereby generating the extended metamodel including the existing metamodel, the condition-class metamodel describing the condition, and the metamodel which defines the association between the condition class and the trace in order to distinguish the presence or absence of the condition with respect to the trace that defines the relationship between the requirement and the model element for satisfying the requirement. Incidentally, the property and attribute of the condition class are not limited to the example of FIG. 5, and can be arbitrarily designed.

Figure 6:
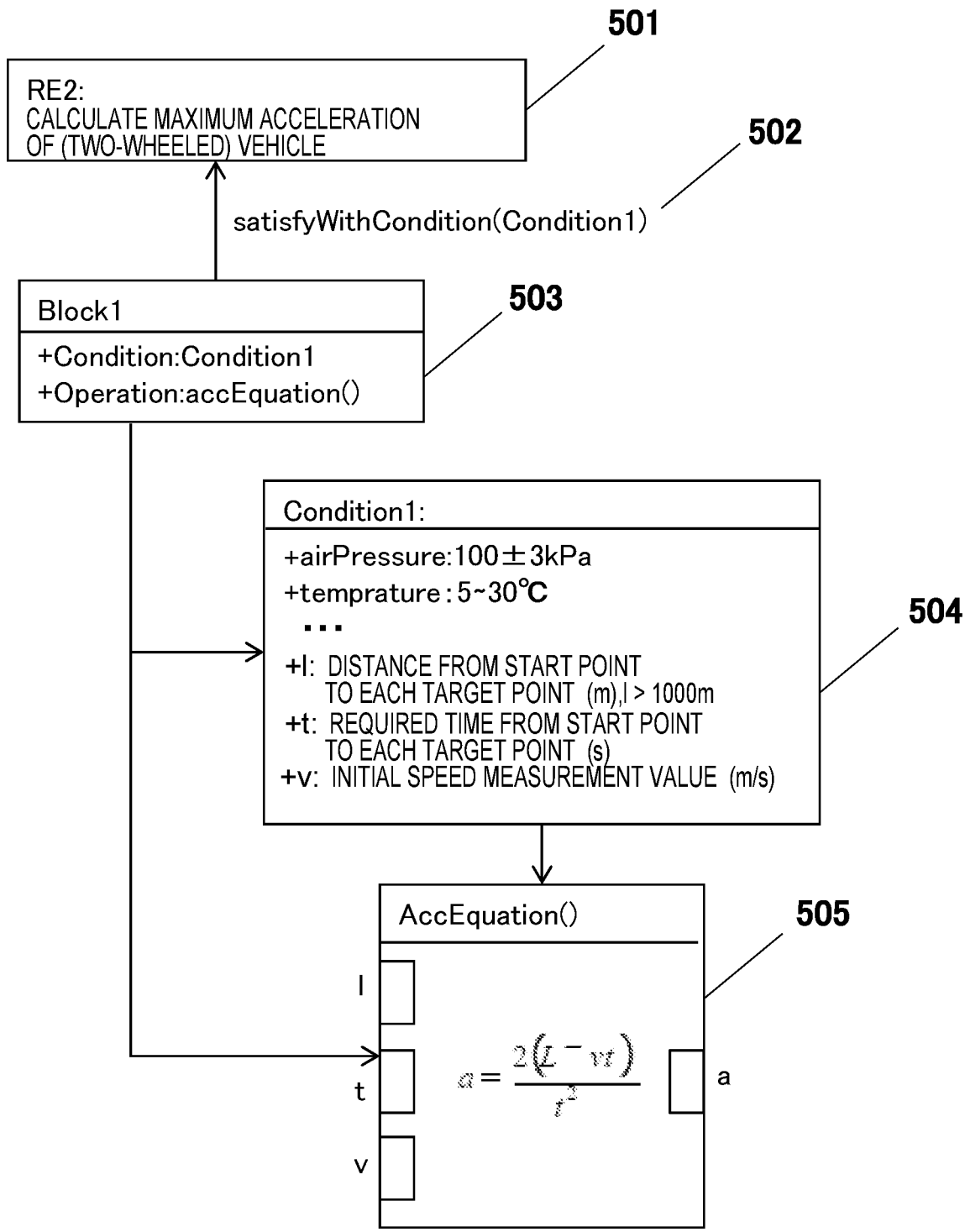
FIG. 6 is a view illustrating an example of an extended model which is constructed according to an extended metamodel generated using a first extension method.

FIG. 6 is a view illustrating an example of an extended model which is constructed according to the extended metamodel generated using the first extension method. In the example of FIG. 6, a conditional satisfying relationship (satisfyWithCondition) 502 is defined between a requirement diagram 501 and a block diagram 503. The conditional satisfying relationship 502 refers to a condition class 504 (Condition 1). In the condition class 504 (Condition 1), a name of each property, descriptions of the properties, and a condition are described. In addition, the condition class 504 refers to a parametric diagram 505 to perform calculation.

The parametric diagram 505 defines an input (I, t, v), an output (a), and a calculation formula. The calculation formula is described, for example, by a mathematical markup language (MathML).

In this manner, the model construction unit 2 can construct the extended model in which each of an unconditional satisfying relationship (satisfy) and the conditional satisfying relationship (satisfyWithCondition) is defined by using the extended metamodel generated according to the first extension method. As a result, it is possible to distinguish whether there is a condition for each requirement, and to define the content of the condition.

(Second Extension Method)

In a second extension method, the metamodel definition unit 1 extends and defines (adds) version information of the metamodel to an attribute of a metamodel at a top class of the existing metamodel. As a result, an extended metamodel containing the version information in the attribute of the top-class metamodel is generated.

Figure 7:
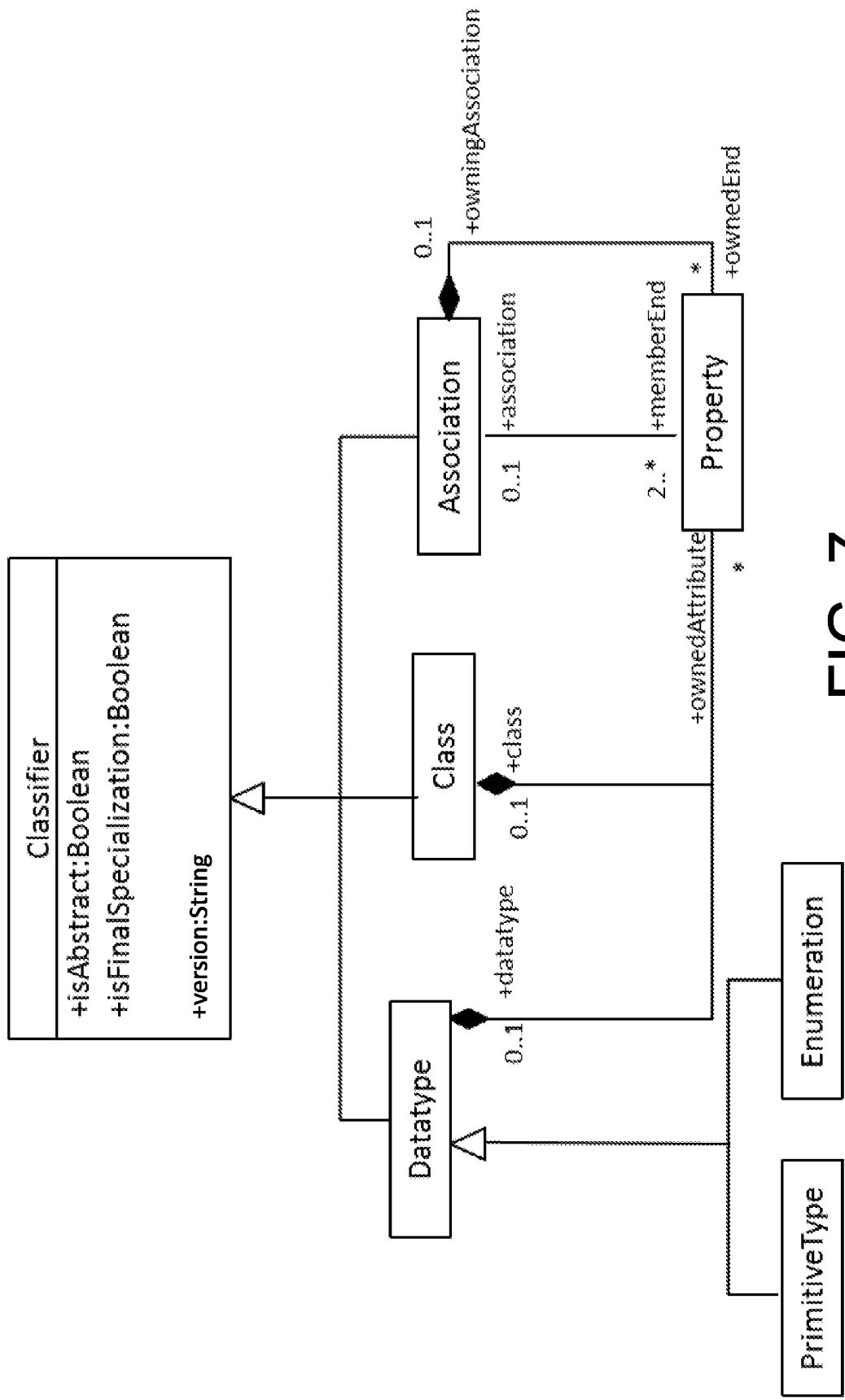
FIG. 7 is a view illustrating an example of an extended metamodel generated using a second extension method.

FIG. 7 is a view illustrating an example of the extended metamodel generated using the second extension method. In FIG. 7, the top class is "Classifier", and "Datatype", "Class", "Association", and the like are defined in the existing metamodel as lower-order classes thereof. The version information (version) is extended and defined as an attribute in "Classifier" according to the second extension method.

Figure 8:
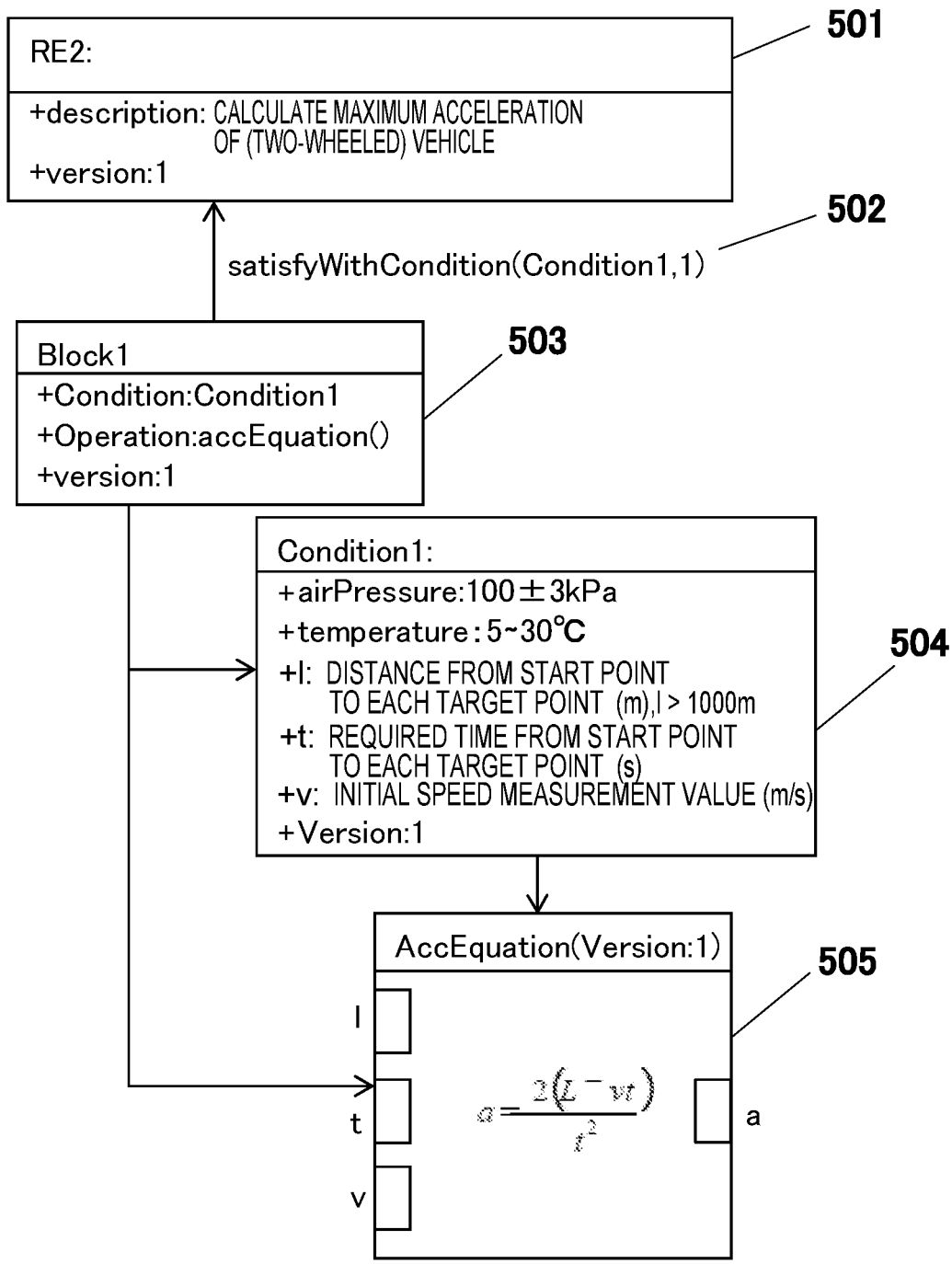
FIG. 8 is a view illustrating an example of an extended model which is constructed according to the extended metamodel generated using the second extension method.

FIG. 8 is a view illustrating an example of an extended model which is constructed according to the extended metamodel generated using the second extension method. As illustrated in FIG. 8, the version information is described in all the model elements 501 to 505 of the extended model. This is because the version information additionally defined in the top class has been inherited. In addition, the version information can be defined for each element that is defined in 501 to 505, for example, a property "airPressure" defined in 504. A description example is illustrated in a row 10 of FIG. 12.

In this manner, the model construction unit 2 can construct the extended model in which each model element has the version information by using the extended metamodel generated according to the second extension method. As a result, it is possible to efficiently update and manage the extended model.

(Third Extension Method)

In a third extension method, the metamodel definition unit 1 extends and defines (adds) a decompose metamodel. The decompose is a class that defines a decomposition relationship (disjunction) of a requirement, and is added as a lower-order class of the trace as illustrated in FIG. 5. As a result, an extended metamodel including the existing metamodel and the decompose metamodel is generated.

Figure 9:
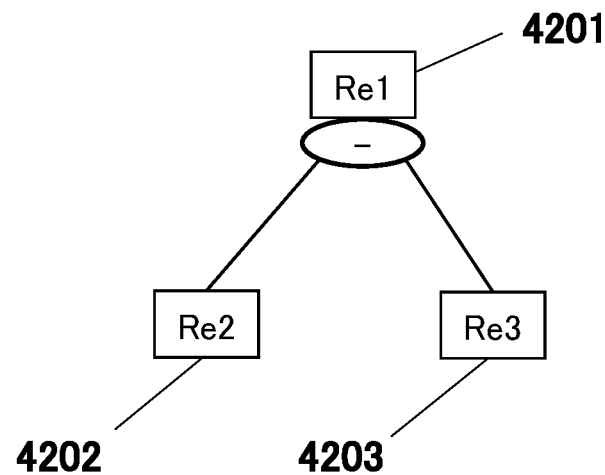
FIG. 9 is a view illustrating an example of an extended model which is constructed according to an extended metamodel generated using a third extension method.

FIG. 9 is a view illustrating an example of an extended model which is constructed according to the extended metamodel generated using the third extension method. In the example of FIG. 9, a requirement 4201 (Re1) is decomposed into a requirement 4202 (Re2) and a requirement 4203 (Re3). This indicates that the requirement 4201 is satisfied by satisfying the requirement 4202 or the requirement 4203.

In this manner, the model construction unit 2 can construct the extended model in which the decomposition relationship of the requirement is defined by using the extended metamodel generated according to the third extension method.

(Fourth Extension Method)

In a fourth extension method, the metamodel definition unit 1 extends and defines (adds) a contribution metamodel as illustrated in FIG. 5. The contribution is a class that defines a contribution degree of each relationship, such as "DerivedReqt", "Copy", "Verify", "Satisfy", "satisfyWithCondition", and "Decompose", and is associated to the trace as illustrated in FIG. 5. A weight is defined as a property in the contribution. The weight is, for example, a change cost of each relationship, but is not limited thereto. As a result, the extended metamodel including the existing metamodel and the contribution is generated.

Figure 10:
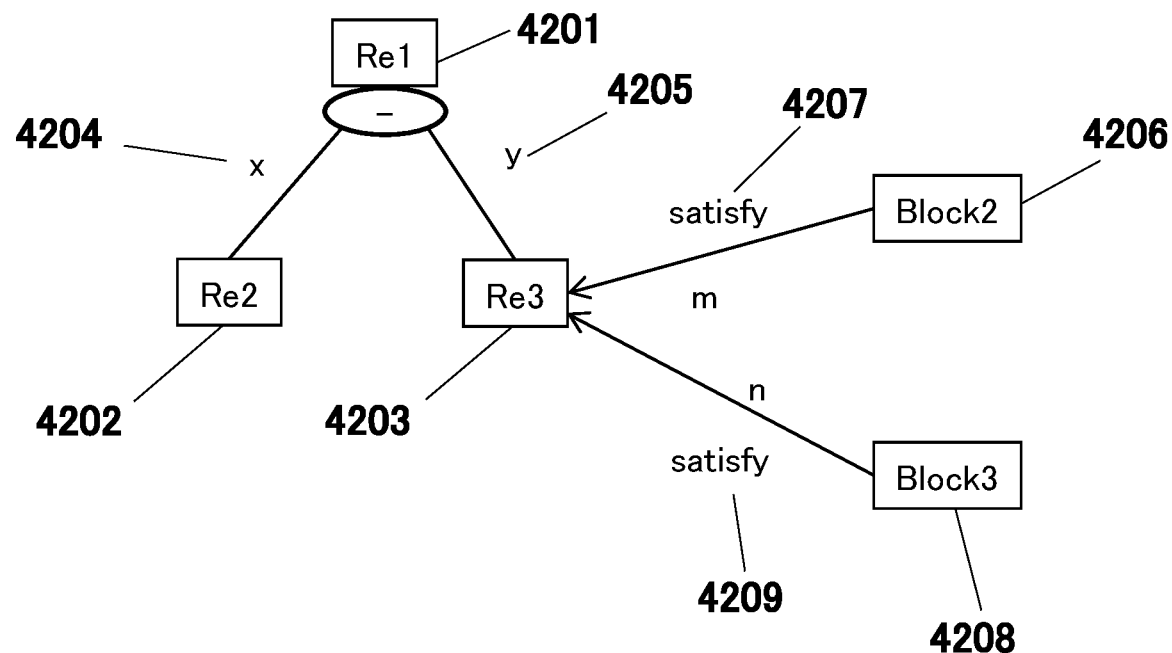
FIG. 10 is a view illustrating an example of an extended model which is constructed according to an extended metamodel generated using a fourth extension method.

FIG. 10 is a view illustrating an example of an extended model which is constructed according to the extended metamodel generated using the fourth extension method. In FIG. 10, x is a weight of a decomposition relationship 4204, and y is a weight of a decomposition relationship 4205. In addition, m is a weight of a satisfying relationship 4207 between a function block 4206 (Block 2) and the requirement 4203 (Re3), and n is a weight of a satisfying relationship 4209 between a function block 4208 (Block 3) and the requirement 4203 (Re3). Each weight can be arbitrarily set. The weight may be selectable, for example, from among integers of one to ten.

In this manner, the model construction unit 2 can construct the extended model in which the weights of the respective relationships are defined by using the extended metamodel generated according to the fourth extension method. When the change cost of each relationship is defined as the weight, it is possible to easily calculate a change cost of a model and to improve the efficiency in management of the change.

Incidentally, the metamodel definition unit 1 may individually use the first extension method to the fourth extension method described above, or may use two or more extension methods in combination.

In addition, the metamodel definition unit 1 and the model construction unit 2 may display the existing metamodel, the extended metamodel, the extended model, and the like using the display device 103. Further, the model construction unit 2 may construct a model according to the existing metamodel and display the constructed model on the display device 103.

(Model Description Language Generation Unit 3)

The model description language generation unit 3 generates the model description language based on the extended meta model. Hereinafter, the model description language is referred to as a model transformation language for SysML (MTL4Sys). FIG. 11 is a view illustrating an example of MTL4Sys. Hereinafter, each line of MTL4Sys in FIG. 11 will be described.

The first line defines to describe each requirement diagram as a requirement class.

The second line defines to describe each block diagram as a block class.

The third line defines to describe a relationship between the requirement class and the block class as the satisfying relationship (satisfy) or the conditional satisfying relationship (satisfyWithCondition). In the third line, the conditional satisfying relationship is defined with an ID of a condition to be referenced to, for example, Condition 1.

The fourth line defines to describe the condition as the condition class.

The fifth line defines to describe an attribute (definition item) of the condition as a property of the condition class.

The sixth line defines to describe an attribute "constantType" of the condition as a property "constantType" of the condition class.

The seventh line defines to describe an attribute "Type" of the condition as an attribute "conditionType" of the condition class.

The eighth line defines to describe a parametric diagram describing an operation or the like as a function class.

The ninth line defines to describe an input of the operation as a parameter of the function class.

The tenth line defines to describe an output of the operation as a return of the function class.

The eleventh line defines to describe a pre-calculation formula of the operation (formula.preCal) as a pre-calculation formula of the function class using the parameter and a pre-calculation condition (pre_cal_condition), and a pre-calculation result as "pre_result".

The twelfth line defines to describe a calculation formula (formula) of the operation as a calculation formula of the function class using the parameter and the pre-calculation result (pre_result), and a calculation result as "result".

The thirteenth line defines to describe a post-calculation formula of the operation as a post-calculation formula of the function class using the parameter and the pre-calculation condition, and a post-calculation result as "after_result".

The fourteenth line defines to describe the version information (version) to be assigned to all model elements of UML as version information of the corresponding model element.

In this manner, the description specification of the extended model based on the script language is defined in MTL4Sys. The model description language generation unit 3 can automatically generate such MTL4Sys based on the extended metamodel.

Incidentally, the model description language generation unit 3 may display MTL4Sys thus generated on the display device 103.

(Script File Generation Unit 4)

FIG. 12 is a view illustrating an example of the script file generated by the script file generation unit 4. The script file of FIG. 12 corresponds to the extended model of FIG. 6. Hereinafter, each line of the script file in FIG. 12 will be described.

The first line describes the description specification (MTL4Sys) of this script file and the version information thereof (version).

The second to fourth lines describe the requirement diagram 501.

The fifth to eighth lines describe the block diagram 503.

The ninth to 29th lines describe the condition class 504 and the parametric diagram 505. Specifically, the ninth to 29th lines have the following descriptions.

The ninth line defines the condition class.

The tenth to the fourteenth lines define a property "airPressure" of the condition class 504. More specifically, the eleventh line describes a value of "constantType" of the property "airPressure", the twelfth line describes a value of "conditionType", and a thirteenth line describes a condition value and a unit thereof.

The fifteenth to twentieth lines define a property I of the condition class 504. More specifically, the fifteenth line defines a name (name), a name language (lang), and an id of the property I. The sixteenth line describes a value of an attribute "description" of the property I. The seventeenth line describes a value (false) of the attribute "constantType". The eighteenth line describes a value (pre_cal_condition) of the attribute "conditionType". The nineteenth line describes a condition (>1000) and a unit (m) thereof.

The 21st and 22nd lines illustrate outlines describing attributes t and v of the condition class 504, respectively. Description specifications of the attributes t and v are the same as a description specification of the property I illustrated in the fifteenth to twentieth lines.

The 23rd and 28th lines describe the parametric diagram 505. More specifically, the 23rd line defines a class of the parametric diagram 505 and the 24th line describes input parameters of the parametric diagram 505. In the 24th line, IDs of attributes defining the respective parameters are used.

The 25th line describes an output of the parametric diagram 505. The 26th and 27th lines describe an example of "formula" that defines a formula. A formula "formula 1" is directly described using MathML in the 26th line, and an ID of a formula (Math1), which has been separately defined, is referred to in the 27th line. In the example of FIG. 12, the formula "Math1" to be referred to is defined in the 30th line. Here, "formula" defining the formula is described using any specification in the 26th and 27th lines.

The script file generation unit 4 can automatically generate the script file as described above based on MTL4Sys and the extended model. The script file generated by the script file generation unit 4 is executed by the dynamic model execution unit 5. When executing the script file, the dynamic model execution unit 5 may cause the display device 103 to display an execution process of the script file and an execution result thereof.

Incidentally, the version information of each model element may be omitted. At this time, it is possible to use the version information of MTLSys in the first line as default version information. In addition, the script file generation unit 4 may cause the display device 103 to display the script file generated in this manner. Further, the script file is described using an extensible markup language (XML) format in the example of FIG. 12, but may be described using another model description language (description format) such as a resource description framework (RDF).

Figure 13:
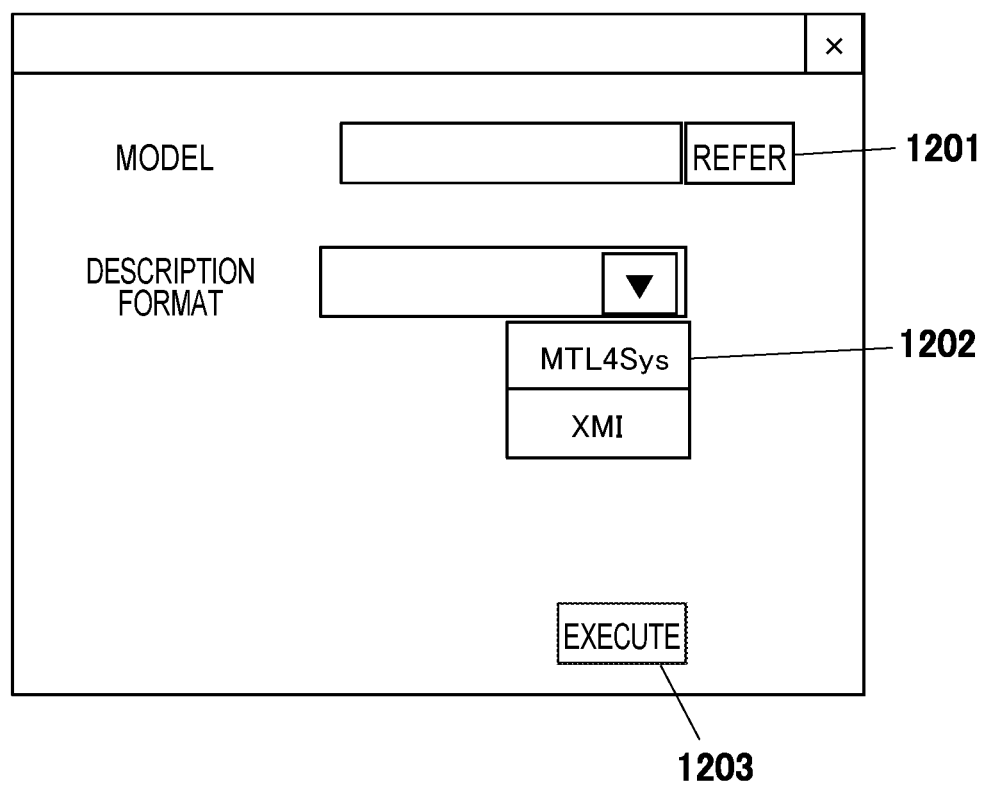
FIG. 13 is a view illustrating an example of a GUI operation screen on which a user can select a model description language.

FIG. 13 is a view illustrating an example of a GUI operation screen on which the user can select the model description language. The operation screen of FIG. 13 is displayed on the display device 103. The user executes various operations of the GUI through the input device 102. Here, a method of generating a script file using the operation screen of FIG. 13 will be described.

The user clicks a refer button 1201 to display selectable extended models and selects an extended model to be used to generate the script file from among the displayed extended models.

Next, the user selects a model description language to be used from among selectable description formats (model description languages). In the example of FIG. 13, a list of the selectable model description languages is displayed in a pull-down list 1202. Although MTL4Sys and XML metadata interchange (XMI) describing SysML are displayed as the selectable model description languages in the example of FIG. 13, RDF and XML may be selected as described above.

Then, when the user clicks an execute button 1203, the script file generation unit 4 generates the script file as illustrated in FIG. 12 according to the model description language selected by the user. The generated script file is saved in the storage device 105. Incidentally, a default value may be set for the selectable extended models and model description languages in FIG. 13.

(Change Analysis Unit 6)

Figure 14:
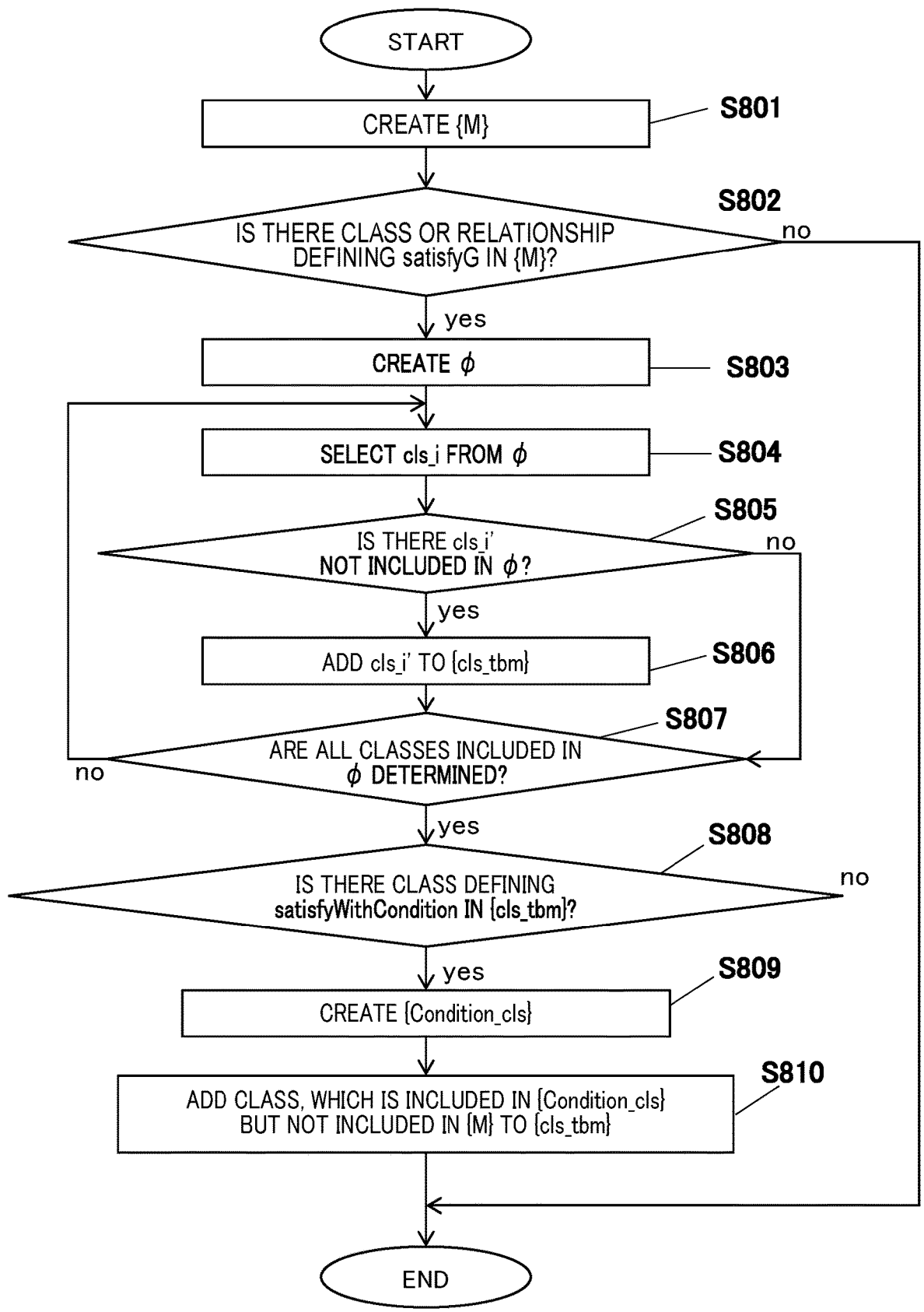
FIG. 14 is a flowchart illustrating an example of a change content analysis process.

When the model construction unit 2 edits an extension model that has been already constructed, the change analysis unit 6 analyzes a change content of the extended model. FIG. 14 is a flowchart illustrating an example of a change content analysis process performed by the change analysis unit 6.

When the model construction unit 2 edits the extended model, the change analysis unit 6 first creates a change content set {M} (step S801). The change content set {M} is a set containing the entire changed content (classes, properties, relationships among the classes, and the like).

Next, the change analysis unit 6 determines whether the change content set {M} contains a class or relationship defining satisfyG (step S802). Here, satisfy G is either "satisfy" (a satisfying relationship) or "satisfyWithCondition" (a conditional satisfying relationship).

When the change content set {M} does not contain the class or relationship defining satisfyG (no in step S802), the change analysis unit 6 ends the analysis process. On the other hand, when the change content set {M} contains the class or relationship defining satisfy G (yes in step S802), the analysis process proceeds to step S803.

In step S803, the change analysis unit 6 extracts the class defining satisfyG from the change content set {M}, and creates a satisfyG set $\varphi=\{cls\_1, cls\_2, \ldots, and\ cls\_n\}$. The satisfyG set $\varphi$ is a set containing an ID (cls_i) of the extracted class.

Next, the change analysis unit 6 selects one class cls_i from the satisfyG set $\varphi$ (step S804).

Then, the change analysis unit 6 determines whether there is a class cls_i' in the selected class cls_i (step S805). The class cls_i' referred to herein is a class which is not included in the satisfyG set φ among classes in which the relationship of satisfyG is defined with respect to the class cls_i.

When there is no class cls_i' (no in step S805), the analysis process proceeds to step S807.

On the other hand, when there is the class cls_i' (yes in step S805), the change analysis unit 6 adds the class cls_i' to a change candidate class set {cls_tbm} (step S806). Thereafter, the analysis process proceeds to step S807.

In step S807, the change analysis unit 6 determines whether processing in steps S805 and S806 has been completed for all the classes cls_i included in the satisfyG set φ. When there is an unprocessed class cls_i (no in step S807), the analysis process returns to step S804, and the change analysis unit 6 selects a class cls_i to be processed next. On the other hand, when the processing has been completed for all the classes cls_i (yes in step S807), the analysis process proceeds to step S808.

In step S808, the change analysis unit 6 determines whether there is a class defining the relationship of satisfyWithCondition in the change candidate class set {cls_tbm}. When there is no class defining the relationship of satisfyWithCondition (no in step S808), the change analysis unit 6 ends the analysis process. On the other hand, when there is the class defining the relationship of satisfyWithCondition (yes in step S808), the analysis process proceeds to step S809.

In step S809, the change analysis unit 6 extracts the class defining the relationship of satisfyWithCondition from the change candidate class set {cls_tbm}, and creates a condition set {Condition_cls}. The condition set {Condition_cls} is a set of condition classes that defines satisfyWithCondition of each extracted class.

Thereafter, the change analysis unit 6 extracts a class, which is included in the condition set {Condition_cls} but not included in the change content set {M}, adds the extracted class to the change candidate class set {cls_tbm} (step S811), and ends the analysis process.

Through the above analysis process, the change analysis unit 6 outputs the change candidate class set {cls_tbm} as an analysis result. As can be understood from the above description, the change candidate class set {cls_tbm} includes a general class, such as a trace, and a condition class which are affected by the change of the extended model. The change analysis unit 6 can automatically extract these classes as change targets.

(Model Update Unit 7)

Figure 15:
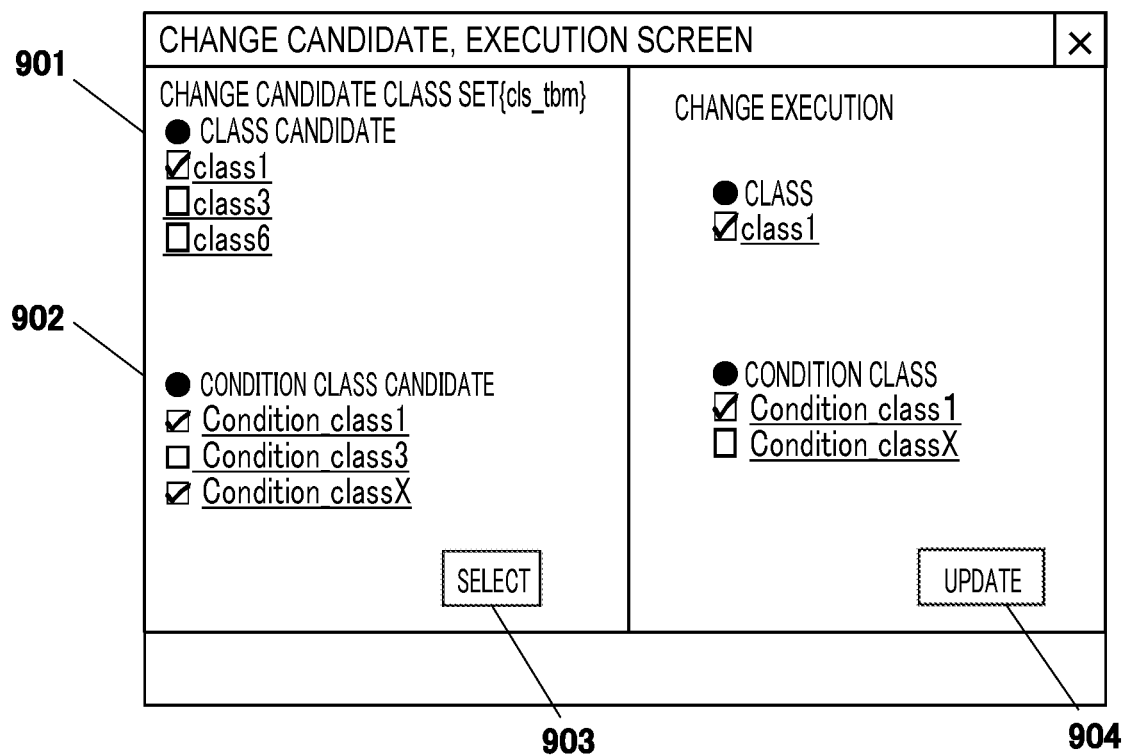
FIG. 15 is a view illustrating an example of a GUI operation screen on which a user can select an update target.

The model update unit 7 updates (changes) the change targets extracted by the change analysis unit 6 among the extended models edited by the model construction unit 2. The model update unit 7 may update all the change targets or may update only a change target selected by the user. FIG. 15 is a view illustrating an example of a GUI operation screen on which the user can select an update target. The operation screen in FIG. 15 is displayed on the display device 103. The user executes various operations of the GUI through the input device 102. Here, a method of updating an extended model using the operation screen of FIG. 15 will be described.

First, the user selects a class to be desirably updated from among the change candidate class set {cls_tbm} displayed on the operation screen. In the example of FIG. 15, a general class candidate 901 and a condition class candidate 902 are displayed as lists, respectively. For example, class1, class3, and class6 are included in the class candidate 901. In addition, the condition class candidate 902 includes Condition_class1, Condition_class3, and Condition_classX, for example.

In the example of FIG. 15, class1, Condition_class1 associated with class1, and Condition_classX selected by the user are selected. Each of the general class and the condition class may be selected by the user, or a condition class (or a general class), which is associated with a general class (or a condition class) selected by the user, may be automatically selected by the model update unit 7. The user clicks a select button 903 to decide a selection content.

The update targets (class1, Condition_class1, and Condition_classX) selected by the user are displayed on the right side of the operation screen of FIG. 15. When the user selects these update targets, the model update unit 7 changes the selected update targets according to an edit content of the extended model. In the example of FIG. 15, class1 and Condition_class1 are selected and changed.

Thereafter, when the user clicks an update button 904, the model update unit 7 adds the change content to be updated to the edited extended model. As a result, the extended model is updated. At this time, it is preferable that the model update unit 7 automatically update version information of the updated class. For example, it is conceivable to set a version of the changed class to N+1 when a version before the change is N. In addition, the model update unit 7 may update version information of a lower-order class of the changed class. For example, versions of all the lower-order classes of the changed class may be increased by one.

(Conversion Rule Generation Unit 8)

Figure 16:
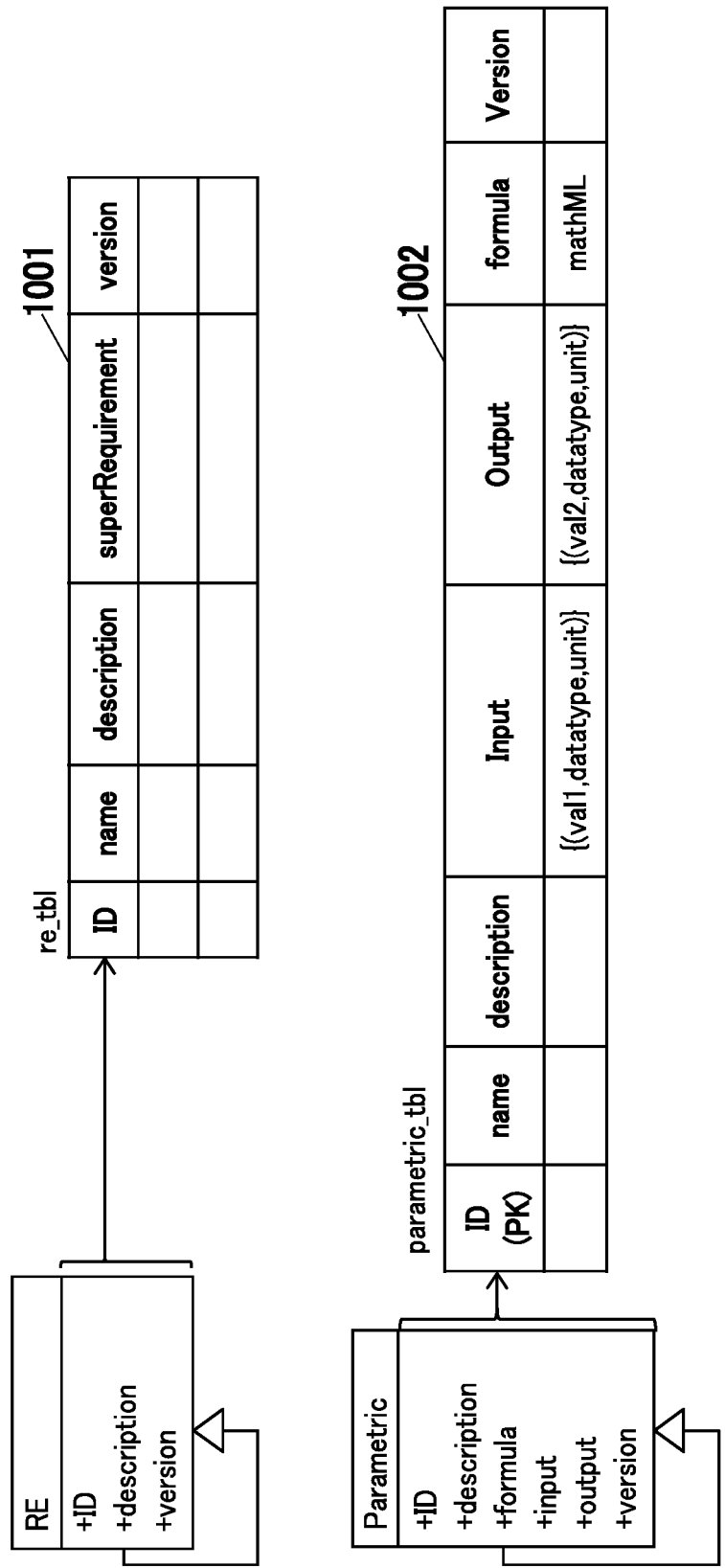
FIG. 16 is a view illustrating an example of a specification of a conversion rule.
Figure 17:
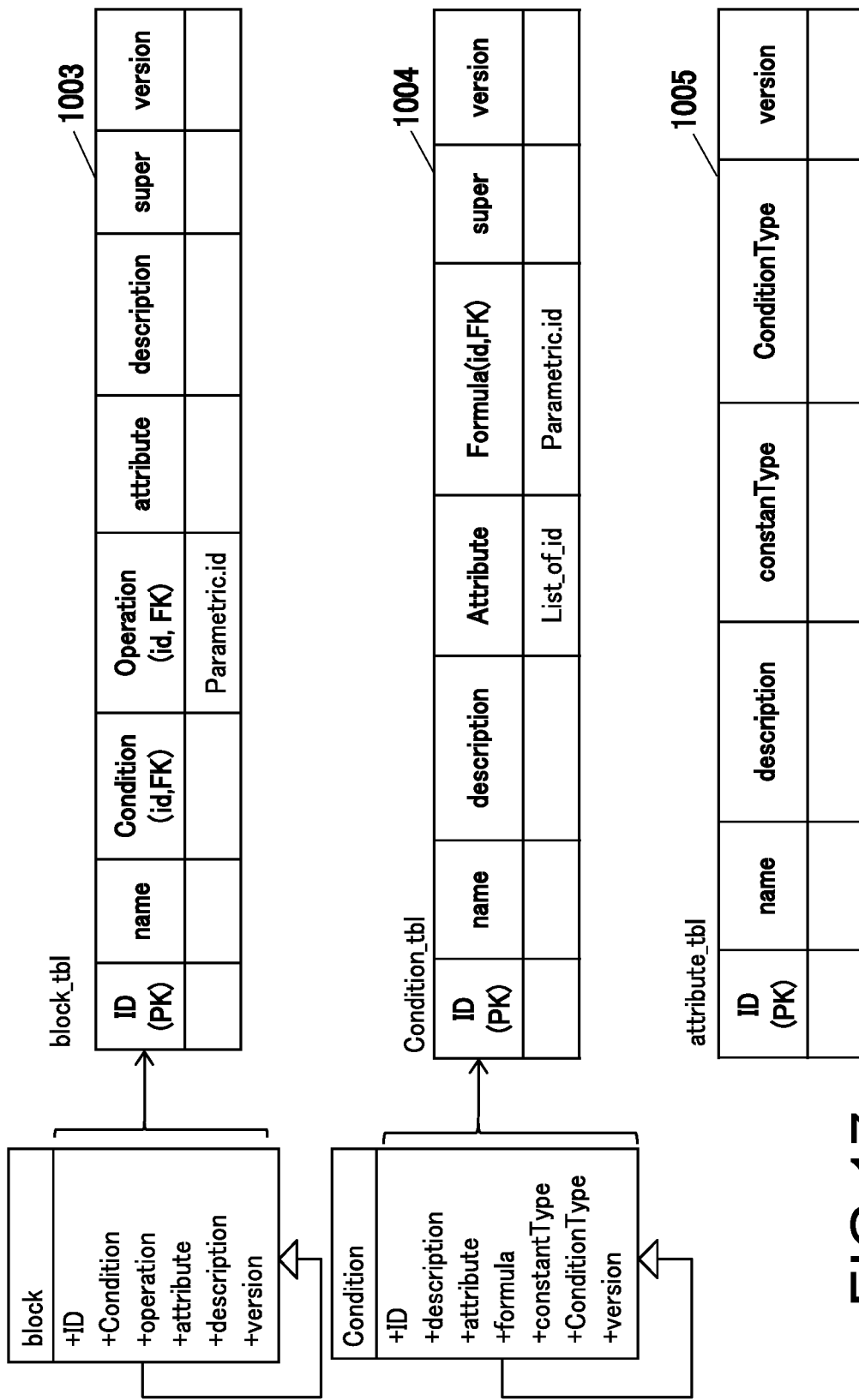
FIG. 17 is a view illustrating an example of a specification of a conversion rule.

The conversion rule generation unit 8 generates the conversion rule, configured to save the requirement diagram, the block diagram, the condition class, and the parametric diagram included in the extended model in the relational database, based on the extended metamodel. FIGS. 16 and 17 are views illustrating examples of specifications of the conversion rule generated by the conversion rule generation unit 8.

As illustrated in FIG. 16, a requirement diagram (RE) described according to the extended metamodel is saved in a requirement table (re_tbl) 1001. The requirement table 1001 has columns of "ID", "name", "description", "superRequirement", and "version". An ID of the requirement diagram is stored in the column "ID". A name of the requirement diagram is stored in the column "name". A description of the requirement diagram is stored in the column "description". A parent requirement whose requirement diagram has an inheritance relationship is stored in the column "superRequirement". Version information of the requirement diagram is stored in the column "version".

A parametric diagram (Parametric) described according to the extended metamodel is saved in a parametric table (parametric_tbl) 1002. The parametric table 1002 has columns of "ID (PK)", "name", "description", "Input", "Output", "formula", and "version". An ID of the parametric diagram is stored in the column "ID (PK)". In addition, the column "ID" can be set as a prime key. A name of the parametric diagram is stored in the column "name". A description of the parametric diagram is stored in the column "description". Information on an input of the parametric diagram is stored in the column "Input". In the example of FIG. 16, a variable name (val1), a variable type (datatype), and a unit thereof (unit) are stored as the information on the input. Information on an output of the parametric diagram is stored in the column "Output". In the example of FIG. 16, a variable name (val2), a variable type (datatype), and a unit thereof (unit) are stored as the information on the output. A calculation formula of the parametric diagram is stored in the column "formula". In the example of FIG. 16, the calculation formula is stored in the format of MathML. Version information of the parametric diagram is stored in the column "version".

As illustrated in FIG. 17, a block diagram (block) described according to the extended metamodel is saved in a block table (block_tbl) 1003. The block table 1003 has columns of "ID (PK)", "name", "Condition (id, FK)", "Operation (id, FK)", "attribute", "description", "super", and "version". An ID of the block diagram is stored in the column "ID". In addition, the column "ID" can be set as a prime key. A name of the block diagram is stored in the column "name". An ID of a condition table 1004 to be described later is stored in the column "Condition". An ID of the parametric table 1002 is stored in the column "Operation". A list of IDs of an attribute table 1005 to be described later is stored in the column "attribute". A description of the block diagram is stored in the column "description". An ID of a parent block (super) whose block diagram has an inheritance relationship is stored in the column "super". Version information of the block diagram is stored in the column "version".

A condition (Condition) described according to the extended metamodel is saved in the condition table (Condition_tbl) 1004. The condition table 1004 has columns of "ID (PK)", "name", "description", "Attribute", "Formula (id, FK)", "super", and "version". An ID of the condition is stored in the column "ID". In addition, the column "ID" can be set as a prime key. A name of the condition is stored in the column "name". A description of the condition is stored in the column "description". A list (List_of_id) of IDs in the attribute table 1005 is stored in the column "Attribute". The ID of the parametric table 1002 is stored in the column "Formula". An ID of a parent block (super) whose block diagram has an inheritance relationship is stored in the column "super". Version information of the block diagram is stored in the column "version".

The condition described according to the extended metamodel and the attribute described in the block diagram are saved in the attribute table (attribute_tbl) 1005. The attribute table 1005 has columns of "ID (PK)", "name", "description", "constantType", "ConditionType", and "version". An ID of the attribute is stored in the column "ID". In addition, the column "ID" can be set as a prime key. A name of the attribute is stored in the column "name". A description of the attribute is stored in the column "description". Variability of the condition is stored in the column "constantType". A type of the condition is stored in the column "ConditionType". Version information of the attribute is stored in the column "version".

(Table Construction Unit 9)

The table construction unit 9 automatically constructs various tables corresponding to the extended model according to the conversion rule having the above-described specification, and stores the constructed tables in the DB 10. FIG. 18 is a view illustrating examples of the tables which are constructed by the table construction unit 9 and correspond to model elements. The tables of FIG. 18 correspond to the extended model of FIG. 8.

As illustrated in FIG. 18, a definition of the block diagram 503 is stored in the first row of a block table 1101. A definition of the condition class 504 is stored in the first row of a condition table 1102. Definitions of "airPressure" and "T", which are the attributes of the condition class 504, are stored in the first and second rows of an attribute table 1103, respectively. A definition of the parametric diagram 505 is stored in the first row of a parametric table 1104.

As described above, IDs (Attr1 and Attr2) of the attribute table 1103 are stored in the column "attribute" of the condition table 1102. An ID (Para_001) of the parametric table 1104 is stored in the column "Formula" of the condition table 1102.

The table constructed by the table construction unit 9 is stored in the DB 10. Incidentally, a plurality of extended models may be stored as a table in the DB 10.

Figure 19:
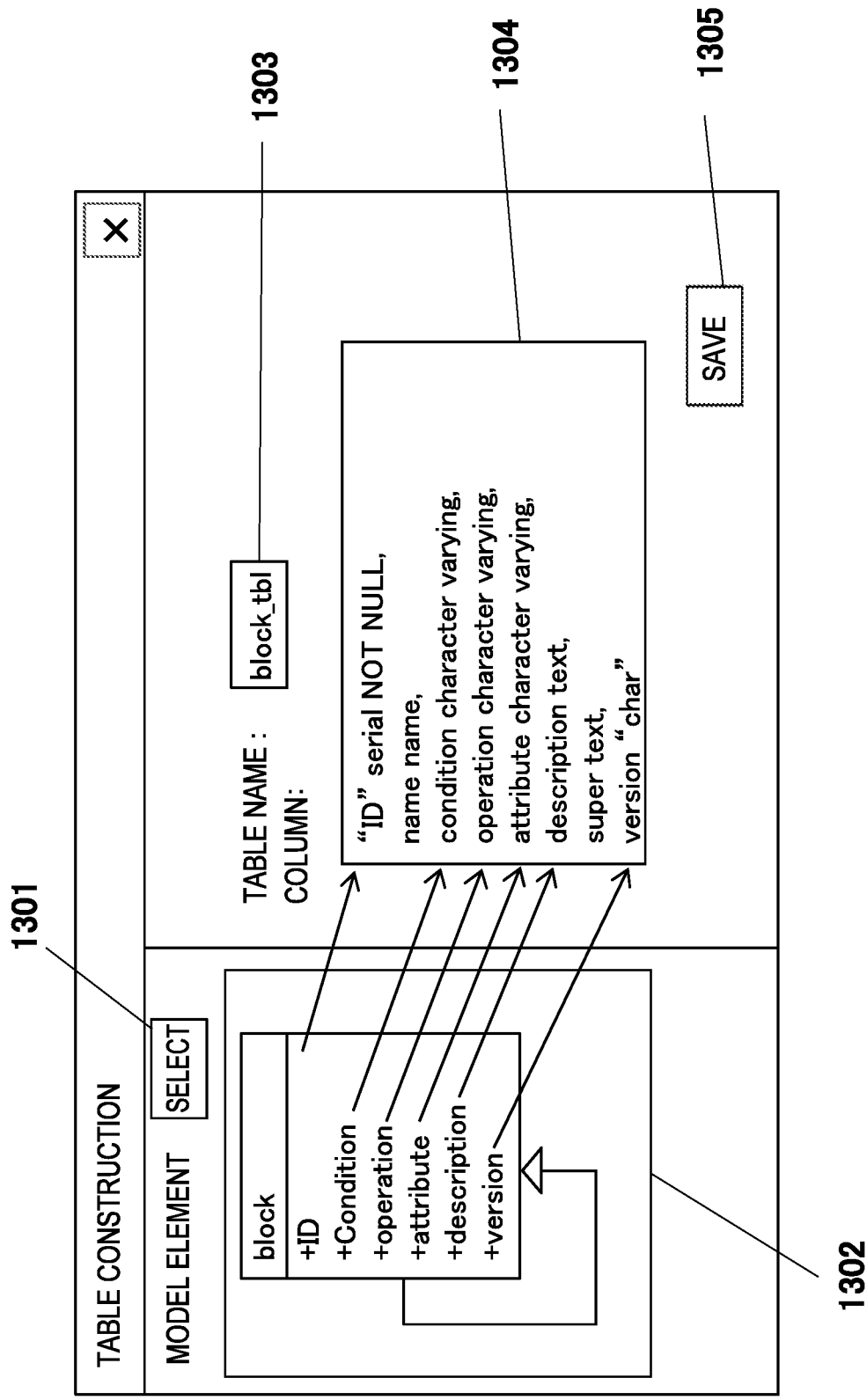
FIG. 19 is a view illustrating an example of a GUI operation screen on which a user can construct a table.

FIG. 19 is a view illustrating an example of a GUI operation screen on which the user can construct a table. The operation screen in FIG. 19 is displayed on the display device 103. The user executes various operations of the GUI through the input device 102. Here, a method of constructing a table using the operation screen of FIG. 19 will be described.

The user clicks a select button 1301 to display model elements (a requirement diagram, a block diagram, and the like) of a selectable extended model, and selects a model element to construct the table from among the displayed model elements.

In the example of FIG. 19, a metamodel display section 1302 is provided on the operation screen. In the metamodel display section 1302, an extended metamodel (for example, an extended metamodel of a block diagram or the like) corresponding to the model element selected in 1301 is displayed. The extended metamodel displayed in the metamodel display section 1302 may be editable by the user's operation.

Next, the user inputs a name of the table to be constructed in a table name input field 1303. In the example of FIG. 19, the name of the table is designated as "block_tbl".

Subsequently, a structured query language (SQL) statement for table generation is automatically generated for the model element selected in 1301 according to the above conversion rule, and displayed and edited in a conversion rule field 1304. The conversion rule generation unit 8 generates a conversion rule according to the content designated by the user. In addition, when the conversion rule designated by the user has been already generated, the generated conversion rule may be displayed in the conversion rule field 1304. Further, the conversion rule displayed in the conversion rule field 1304 may be editable by the user's operation.

Then, when the user clicks a save button 1305, the table construction unit 9 constructs the table corresponding to the model element selected by the user according to the conversion rule displayed in the conversion rule field 1304. The table constructed in this manner is stored in the DB 10.

As described above, the system design apparatus according to the present embodiment can extend and define the metamodel of the condition class describing the condition, the metamodel defining the association between the condition class and the trace in order to distinguish the presence or absence of the condition from the trace, the metamodel of the version information, the decompose metamodel, the contribution metamodel, and the like, with respect to the existing metamodel. As a result, it is possible to enhance the description performance using the modeling languages such as UML and SysML.

In addition, the model update management and integrated design become easy through the above-described extension and definition, and thus, it is possible to efficiently develop a system and to reduce development cost and maintenance cost.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A system design apparatus, comprising:
processing circuitry configured to
generate a second metamodel based on a first metamodel described using a modeling language, the second metamodel including (1) the first metamodel, (2) a metamodel of a condition class which describes a condition with respect to a requirement, and (3) a metamodel which describes an association between the condition class and a trace, in order to distinguish whether the trace has the condition, the trace defining a relationship between the requirement and a model element regarding the requirement;
construct a model according to the second metamodel; and
generate a script file corresponding to the model.

2. The system design apparatus according to claim 1, wherein the second metamodel generated by the processing circuitry includes at least one of a type of the condition and variability of the condition as a property of the condition class.

3. The system design apparatus according to claim 1, wherein the second metamodel generated by the processing circuitry includes version information as a top-class property.

4. The system design apparatus according to claim 1, wherein the second metamodel generated by the processing circuitry includes a decompose metamodel which defines a decomposition relationship of the requirement.

5. The system design apparatus according to claim 1, wherein the second metamodel generated by the processing circuitry includes a contribution metamodel which defines a contribution degree of each relationship.

6. The system design apparatus according to claim 1, wherein the processing circuitry is further configured to generate a model description language which defines a description format to describe the model defined according to the second metamodel as a script language.

7. The system design apparatus according to claim 1, wherein the processing circuitry is further configured to execute the script file.

8. The system design apparatus according to claim 1, wherein the processing circuitry is further configured to analyze a change content of the model based on whether the trace has the condition.

9. The system design apparatus according to claim 8, wherein the processing circuitry is further configured to update the model based on a result of the analysis.

10. The system design apparatus according to claim 1, wherein the processing circuitry is further configured to generate a conversion rule to store the model in a relational database.

11. The system design apparatus according to claim 10, wherein the processing circuitry is further configured to construct a table of the relational database corresponding to the model according to the conversion rule.

12. The system design apparatus according to claim 1, further comprising a display that displays the model.

13. A system design method, comprising:
generating a second metamodel based on a first metamodel described using a modeling language, the second metamodel including (1) the first metamodel, (2) a metamodel of a condition class which describes a condition with respect to a requirement, and (3) a metamodel which describes an association between the condition class and a trace in order to distinguish whether the trace has the condition, the trace defining a relationship between the requirement and a model element regarding the requirement;
constructing a model according to the second metamodel; and
generating a script file corresponding to the model.

14. The system design method according to claim 13, wherein the second metamodel includes at least one of a type of the condition and variability of the condition as a property of the condition class.

15. The system design method according to claim 13, wherein the second metamodel includes version information as a top-class property.

16. The system design method according to claim 13, wherein
the second metamodel includes a decompose metamodel which defines a decomposition relationship of the requirement.

17. The system design method according to claim 13, wherein the second metamodel includes a contribution metamodel which defines a contribution degree of each relationship.

18. The system design method according to claim 13, further comprising generating a model description language which defines a description format to describe the model defined according to the second metamodel as a script language.

19. The system design method according to claim 13, further comprising executing the script file.

20. The system design method according to claim 13, further comprising
analyzing a change content of the model based on whether the trace has the condition.

* * * * *